(12) United States Patent
Reed

(10) Patent No.: US 10,484,104 B2
(45) Date of Patent: Nov. 19, 2019

(54) METHOD FOR OVER-THE-AIR MEASUREMENT SIGNAL GENERATION

(71) Applicant: Spirent Communications, Inc., Sunnyvale, CA (US)

(72) Inventor: John Douglas Reed, Arlington, TX (US)

(73) Assignee: Spirent Communications, Inc., San Jose, CA (US)

( * ) Notice: Subject to any disclaimer, the term of this patent is extended or adjusted under 35 U.S.C. 154(b) by 1047 days.

(21) Appl. No.: 13/971,622

(22) Filed: Aug. 20, 2013

(65) Prior Publication Data

US 2015/0054687 A1    Feb. 26, 2015

(51) Int. Cl.
*H04B 17/00*      (2015.01)
*H04B 17/10*      (2015.01)

(52) U.S. Cl.
CPC ....... *H04B 17/101* (2015.01); *H04B 17/0085* (2013.01)

(58) Field of Classification Search
CPC .............................. H04B 3/462; H04B 3/466
USPC ......... 455/67.11, 67.12, 67.13, 67.14, 67.16, 455/101
See application file for complete search history.

(56) References Cited

U.S. PATENT DOCUMENTS

| | | |
|---|---|---|
| 5,634,206 A | 5/1997 | Reed |
| 8,761,684 B2 | 6/2014 | Reed |
| 8,995,511 B2 | 3/2015 | Reed |
| 9,024,828 B2 | 5/2015 | Reed |
| 2011/0299570 A1 | 12/2011 | Reed |
| 2012/0071107 A1* | 3/2012 | Falck ....................... H01Q 3/24 455/67.12 |
| 2012/0225624 A1* | 9/2012 | Kyosti ................. H01Q 3/2605 455/67.11 |

(Continued)

FOREIGN PATENT DOCUMENTS

EP      0772916 B1      7/2006

OTHER PUBLICATIONS

Reed, Doug, "MIMO OTA Antenna Measurements", Mar. 2011, 35 pages.

(Continued)

*Primary Examiner* — Ping Y Hsieh
(74) *Attorney, Agent, or Firm* — Haynes Beffel & Wolfeld LLP; Ernest J. Beffel, Jr.

(57) ABSTRACT

A method is provided for generating and transmitting a test signal for an over-the-air test of a device-under-test that is in simulated motion. The method includes dithering Doppler shifts of a carrier frequency of the test signal on sub-path components of the test signal to produce slightly different frequencies per sub-path component, wherein the sub-path components are at a first and second polarization orientations. Dithering Doppler shifts can include dithering a first sub-path component at the first polarization orientation while keeping this sub-path component at the second polarization orientation at the original Doppler shift of the carrier frequency of the test signal, or keeping a first sub-path component at the first polarization orientation at the carrier frequency of the test signal while dithering this sub-path component at the second polarization orientation. Dithering Doppler shifts can include dithering sub-path components at the first and the second polarization orientation.

20 Claims, 8 Drawing Sheets

(56) References Cited

U.S. PATENT DOCUMENTS

2014/0302798 A1    10/2014   Reed

OTHER PUBLICATIONS

"Multipath and Doppler Effects and Models", Polytechnic University, 2005, 47 pages.
Mitra, Dr. Abhijit, "Lecture Notes on Mobile Communication: Multipath Wave Propagation and Fading", Chapter 5, Dept. of Electronics and Communication Engineering, Indian Institute of Technology Guwahati, ppg 75-100; Nov. 2009, [retrieved on Sep. 21, 2016] Retrieved from the Internet <URL: http://www.iitg.ernet.in/scifac/qip/public_html/cd_cell/chapters/a_mitra_mobile_communication/chapter5.pdf>.

* cited by examiner

Channel Matrix H Representing the Complex Channel Gains

| Sub-Path Offset Angles for 1 rms Angle Spread | |
|---|---|
| Sub-Path # (m) | Offset Angles |
| 1, 2 | ± 0.0447 |
| 3, 4 | ± 0.1413 |
| 5, 6 | ± 0.2492 |
| 7, 8 | ± 0.3715 |
| 9, 10 | ± 0.5129 |
| 11, 12 | ± 0.6797 |
| 13, 14 | ± 0.8844 |
| 15, 16 | ± 1.1481 |
| 17, 18 | ± 1.5195 |
| 19, 20 | ± 2.1551 |

FIG. 5

METHOD FOR OVER-THE-AIR MEASUREMENT SIGNAL GENERATION

BACKGROUND

Field of the Invention

The technology disclosed relates to lab based over-the-air (OTA) testing of multiple antenna devices, and more particularly to techniques for OTA testing suitable for producing a test signal to emulate a wireless channel.

Description of Related Art

When designing over-the air testing approaches, channel modeling concepts are applied in order to ensure that the received signal is representative of the desired test condition. The following standard MIMO (multiple-input multiple-output) radio channel model H is defined in ITU-R M.2135 (International Telecommunication Union, Radio Communication Sector, Mobile Series).

$$H_{u,s,n}(t;\tau) = \sum_{m=1}^{M} \begin{bmatrix} F_{rx,u,V}(\varphi_{n,m}) \\ F_{rx,u,H}(\varphi_{n,m}) \end{bmatrix}^T \begin{bmatrix} \alpha_{n,m,VV} & \alpha_{n,m,VH} \\ \alpha_{n,m,HV} & \alpha_{n,m,HH} \end{bmatrix} \begin{bmatrix} F_{tx,s,V}(\phi_{n,m}) \\ F_{tx,s,H}(\phi_{n,m}) \end{bmatrix}$$
$$\times \exp(j2\pi\lambda_0^{-1}(\bar{\varphi}_{n,m}\cdot\bar{r}_{rx,u}))\exp(j2\pi\lambda_0^{-1}(\bar{\phi}_{n,m}\cdot\bar{r}_{tx,s}))$$
$$\times \exp(j2\pi v_{n,m}t)\delta(\tau-\tau_{n,m})$$

where:

$F_{rx,u,V}$ and $F_{rx,u,H}$: antenna element u field patterns for vertical and horizontal polarizations respectively $\alpha_{n,m,VV}$ and $\alpha_{n,m,VH}$: complex gains of vertical-to-vertical and horizontal-to-vertical polarizations of ray n,m respectively $\lambda_0$: wave length of the carrier frequency $\bar{\phi}_{n,m}$: angle of departure (AoD) unit vector $\bar{\varphi}_{n,m}$: angle of arrival (AoA) unit vector $\bar{r}_{tx,s}$ and $\bar{r}_{rx,u}$: location vectors of element s and u respectively $v_{n,m}$: Doppler frequency component of ray n,m.

This equation is typically implemented in computer models and channel emulation hardware. Each "link" defines a path between a base antenna and a mobile antenna. Each path m is made up of N sub-paths, where "n" is a sub-path index, so n, m denotes a sub-path component n of a path m in a channel of M paths.

However, as described herein, the use of a standard model at the channel emulation hardware does not allow proper control of the power levels at a device-under-test in a radiated dual polarized configuration.

An opportunity arises to provide a method of generating and transmitting a test signal for an OTA test of a device-under-test that is in simulated motion to allow proper control of the power levels.

SUMMARY

One implementation of the technology disclosed teaches a method of generating and transmitting a test signal for an over-the-air test of a device-under-test that is in simulated motion. The method includes dithering Doppler shifts of a carrier frequency of the test signal on one or more sub-path components of the test signal to produce slightly different frequencies per sub-path component, wherein the sub-path components are at a first polarization orientation and a second polarization orientation.

Dithering Doppler shifts can include dithering a first sub-path component in the sub-path components at the first polarization orientation while keeping the first sub-path component in the sub-path components at the second polarization orientation at a first Doppler shift of the carrier frequency of the test signal. Dithering Doppler shifts can include keeping a first sub-path component in the sub-path components at the first polarization orientation at a second Doppler shift of the carrier frequency of the test signal while dithering the first sub-path component in the sub-path components at the second polarization orientation. The first Doppler shift or the second Doppler shift of the carrier frequency of the test signal can be an undithered Doppler shift of the carrier frequency of the test signal. Dithering Doppler shifts can also include dithering a first sub-path component in the sub-path components at the first polarization orientation and dithering the first sub-path component in the sub-path components at the second polarization orientation. A set of sub-path components may be dithered at one output with respect to another, where the outputs are at a first polarization orientation and a second polarization orientation. For example odd numbered sub-paths may be dithered at a first output with a first polarization orientation and even numbered sub-paths may be dithered at a second output with a second polarization orientation. The first polarization orientation can be horizontal and the second polarization orientation can be vertical.

Dithering Doppler shifts can correspond to varying angles of arrival of the sub-path components of the test signal relative to the simulated motion of the device-under-test. Dithering Doppler shifts can correspond to varying one or more directions of travel with respect to specific sub-paths by the device-under-test in simulated motion relative to the test signal. Dithering Doppler shifts can also correspond to varying one or more velocities of the device-under-test in simulated motion relative to each sub-path of the test signal.

A system is provided for generating and transmitting a test signal for an over-the-air test of a device-under-test that is in simulated motion. The system includes a plurality of transmit antennas for transmitting sub-path components of the test signal, where the plurality of transmit antennas includes antennas arranged to transmit a first polarization orientation, and antennas arranged to transmit a second polarization orientation different from the first polarization orientation.

The system includes a channel emulator generating the sub-path components of the test signal. The system includes a controller coupled to the channel emulator, including logic to perform the method described herein to dither Doppler shifts of a carrier frequency of the test signal on the sub-path components of the test signal to produce slightly different frequencies per sub-path component.

BRIEF DESCRIPTION OF THE DRAWINGS

FIG. 5 is a table of 20 sub-path offset angles within a cluster, given for a one degree rms (root-mean-square) angle spread.

DETAILED DESCRIPTION

The following detailed description is made with reference to the figures. Examples are described to illustrate the present technology, not to limit its scope, which is defined by the claims. Those of ordinary skill in the art will recognize a variety of equivalent variations on the description that follows.

Figure 1:
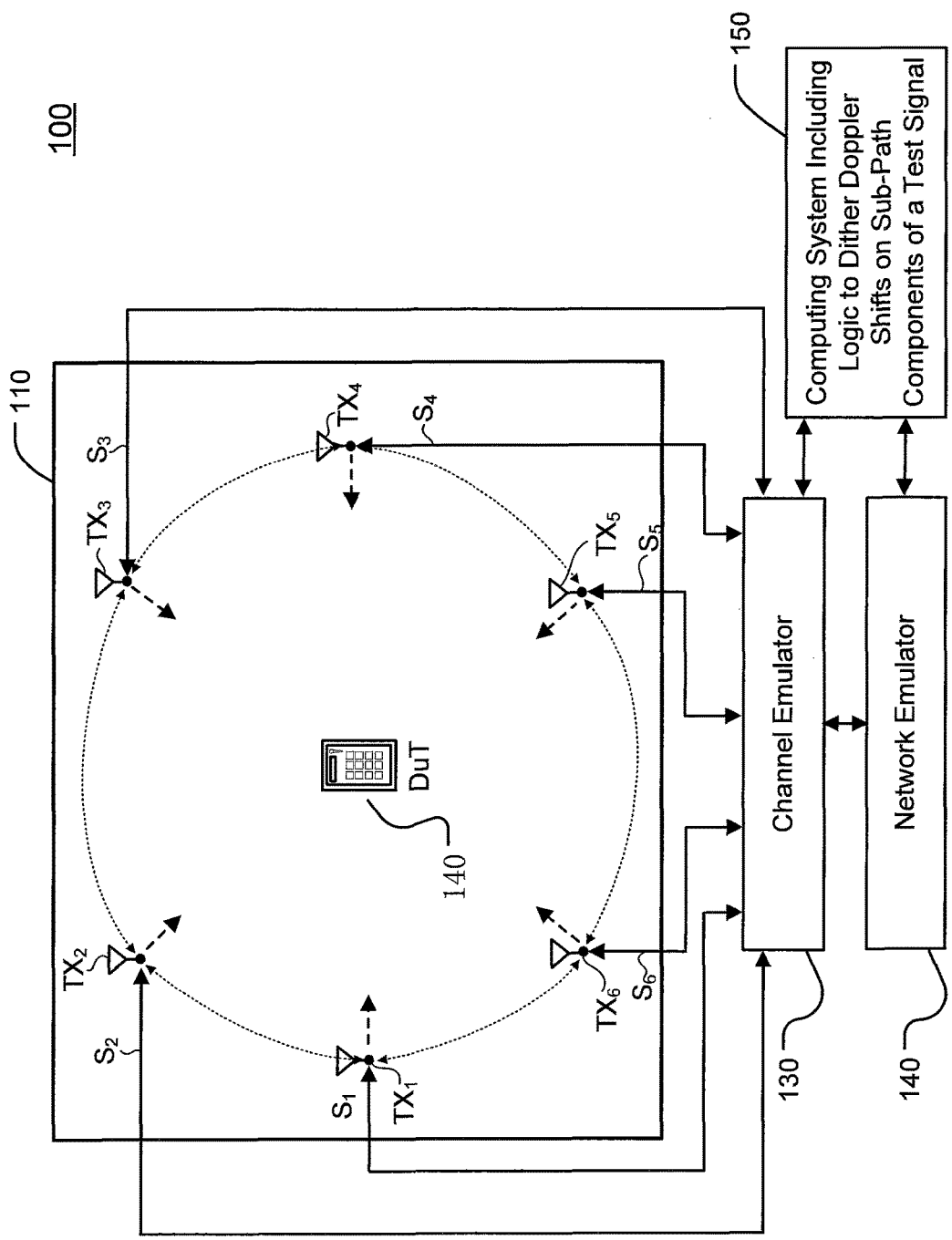
FIG. 1 is a simplified block diagram of an embodiment of a lab based system 100 for emulating a wireless channel between a transmitter and a receiver as described herein.

FIG. 1 is a simplified block diagram of an embodiment of a lab based system 100 for emulating a wireless channel between a transmitter and a receiver as described herein, which can be used to evaluate the performance of multiple antenna devices. An anechoic chamber 110 provides attenuation of reflected signals and suppression of external undesired interference signals as known in the art.

A DuT 140 (device-under-test), such as a mobile device having one or more receive antennas, can be placed within the anechoic chamber 110 in the lab based system 100, so that the performance of the DuT 140 can be evaluated using the techniques described herein. As used herein, the term "mobile device" refers generally to any portable device that has wireless connectivity via a set of one or more antennas to at least one network, such as a cellular network and/or internet. The mobile device may be a cellular telephone, PDA, laptop computer, or other device.

A plurality of transmit antennas TX are arranged within the anechoic chamber 110 and coupled to channel emulator circuitry 130 and network emulator circuitry 140. Although six transmit antennas TX are shown in the example shown in FIG. 1, the actual number of transmit antennas in the lab based system 100 can vary from embodiment to embodiment, depending upon the particular details of the wireless channel being emulated. For example, in one embodiment 8 dual polarized transmit antenna elements are used. Two embodiments include 8 dual polarized transmit antennas equally spaced in a circle, and 16 dual polarized transmit antennas equally spaced in a circle. Other embodiments include 3, 4, or 6 dual polarized transmit antennas. The dual polarized transmit antennas can be grouped to form one or more sectors of a circle as an alternative to equal spacing. As described in more detail below, the transmit antennas, labeled-"TX", transmit a test signal for an over-the-air test of the DuT 140 comprised of sub-path components of the test signal. As used herein, the term "sub-path component" refers to portions of a signal having specific Doppler shifted and transmitted by a given transmit antenna, where the transmission of all of the sub-path components emulates the test signal in the wireless channel. For instance, in a case where two transmit antennas are used to emulate a test signal, the test signal will have two sets of sub-path components, one set provided for each antenna. Further, the characteristics of the test signal will be made up of combination of the sets of sub-path components, which are also characterized by their path delay, Doppler shift, and power weighted angle spread for each path of the channel model being emulated.

In the example shown in FIG. 1, a single transmit antenna TX is illustrated at each particular transmit location. More generally, one or more transmit antennas may be arranged at each transmit location within the anechoic chamber 110. In embodiments the transmit antennas can be for example Vertically (V) polarized, or Horizontally (H) polarized, or a circularly polarized antenna, among others. For example, two or more antennas having different polarizations may be arranged at each transmit location, such as V & H polarized antennas, +45 and −45 degree slanted antennas, right hand and left hand circular polarized antennas, and may include antennas separated in elevation at the same or different polarizations, etc. Each of the co-located antennas at a given transmit location may be connected to different outputs from the channel emulator 130, and thus could transmit simultaneously.

The channel emulator 130 is coupled to the transmit antennas TX to provide a controlled lab test environment for emulating network communications with the wireless channel. The channel emulator 130 provides the ability to emulate radio channel characteristics such as fading, noise, etc. Embodiments of the channel emulator 130 can include one or more Spirent VR5 Wireless Channel Emulators manufactured by Spirent Communications of Eatontown, N.J., arranged to provide appropriate transmit signals $S_i$ to emulate the wireless channel for each of the emulated sub-path components.

The system further includes network emulator 140 to emulate network conditions such as operating bands, air-interface protocols, downlink data rates, uplink data rates, code power, etc. The network emulator 140 can include one or more Spirent E2010S Network Emulators manufactured by Spirent Communications of Eatontown, N.J., coupled to the channel emulator 130. In embodiments described herein, the network emulator 140 can include more than one network emulator to support MIMO (multiple-input multiple-output), handover and/or interference testing.

The system 100 also includes a computing system 150 to initiate the test, to configure and remotely operate the various devices of the system 100 during the test, and to perform post-test processing of the measured results. The computing system 150 executes a computer program for communication and control of the operation of the various devices including computing the arrangement of the transmit antennas TX and the characteristics of transmit signals $S_i$ transmitted by the transmit antennas TX to the DuT 140.

Figure 2:
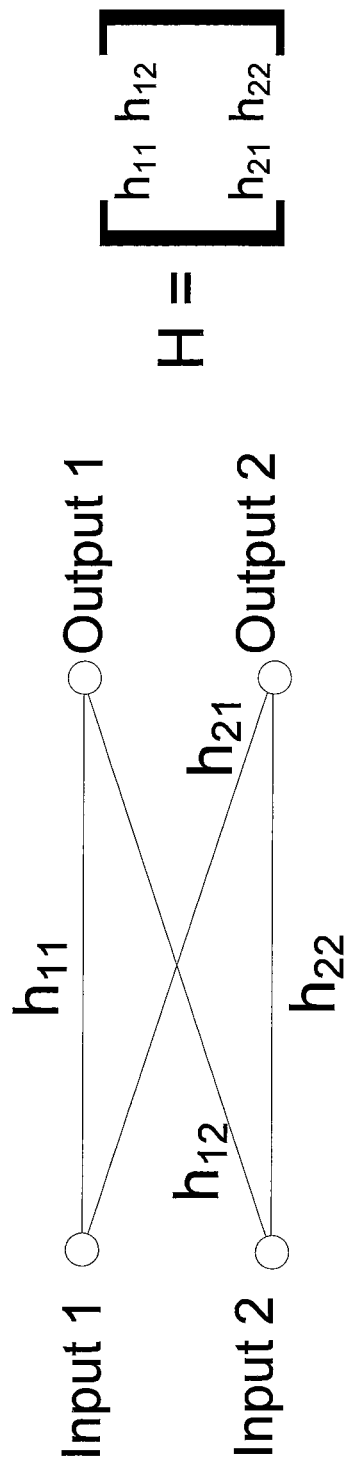
FIG. 2 illustrates channel matrix H representing complex channel gains.

FIG. 2 illustrates a channel matrix H representing complex channel gains. Each path is made up of a number of sub-paths that produce complex path-gains (e.g. h11, h12, h21, h22) between inputs and outputs of the channel. The inputs typically represent the transmit antennas, and the outputs represent the signals present at the receive antennas for conducted testing. For a radiated model used in an over-the-air test, the inputs represent the signal from the base station or network emulator, and the outputs represent signals that are sent to the radiating elements within the test chamber. Output 1, such as one of transmit antennas TX in FIG. 1, can transmit sub-path components of a test signal on the sub-paths at a first polarization orientation. Output 2, such as another one of transmit antennas TX in FIG. 1, can transmit sub-path components of the test signal on the sub-paths at a second polarization orientation. Channel matrix H with its Outputs 1 & 2 can transmit sub-path components of the test signal to antennas in the test chamber for both the first and second polarization orientations. The first and second polarization orientations can be vertical (V) and horizontal (H) orientations.

Each path is comprised of one or more sets of sub-paths, typically 20 sub-paths per output as defined by a scaled version of angles in FIG. 5, wherein the emulated path in the channel emulator (e.g. 130, FIG. 1) has an average angle of departure (AoD) at a base station (BS) and an average angle of arrival (AoA) at a mobile station (MS). The sub-paths that define each path represent individual plane-waves and have equal delay and a specific angle spread at the base station. Angle spread is a power weighted "sigma" of a set of angles, which has a magnitude less than the range of angles in the set of angles. For example, a range of angles of +/−75 degrees can have an angle spread (i.e. sigma) of 35 degrees. Planewaves are observed on each antenna, where the phase at each antenna is related to the angle of arrival (AoA) or angle of departure (AoD) and the distance between the antenna elements, such that the phase difference between antenna elements is $2\pi*D/\lambda*\sin(\theta)$ for an ideal antenna array, where $\lambda$ is the wavelength of the carrier frequency, and $\theta$ is the angle between the sub-path and the assumed emulated direction of travel. A realistic antenna may have a unique phase response that is a function of angle. Calculation of emulated channels involves a channel model, such as the channel model H described herein, and antenna assumptions are used in calculating the net signal. The assumed antennas may be called virtual antennas.

Figure 3:
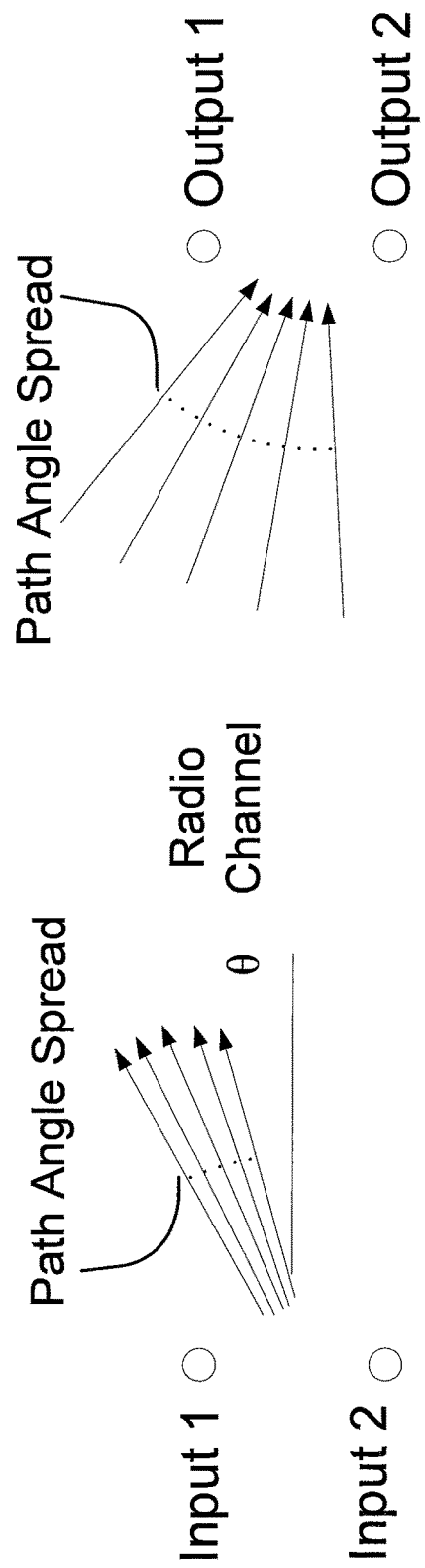
FIG. 3 illustrates a top view of ideal isotropic virtual antennas separated by a distance.

FIG. 3 illustrates a top view of ideal isotropic virtual antennas separated by a distance D, although other virtual antenna assumptions could be used to modify the signal characteristics observed. Signal sub-paths are shown referenced to the virtual antennas. The virtual antenna is the antenna used in the computer model to form the signal, which may be sent to the output of a channel emulator and used to drive an actual antenna element in a radiated measurement.

Simulated motion at the MS receiver is used to produce a fading waveform on each virtual antenna. Each sub-path experiences a Doppler shift based on $fd=velocity/\lambda*\cos(\theta)$, where $\lambda$ is the wavelength of the carrier frequency, and $\theta$ is the angle of arrival of the signal minus the direction of travel of the emulated motion. Velocity is the emulated velocity of the device under test (e.g. DuT 140 in FIG. 1). The DuT does not have to move in a test environment, such as an anechoic chamber, but by setting the model to have a velocity, the fading waveforms now vary as if the device is moving. The Doppler applied to each sub-path is different according to the TX location (FIG. 1).

FIG. 3 represents the model that is used to produce the complex path gains shown in FIG. 2. Inputs (e.g. Input 1, Input 2) and outputs (e.g. Output 1, Output 2) enable the path to be specified and described by the instantaneous channel matrix H. To use as a channel emulator, a two branch LTE (Long-Term Evolution) radio signal (or similar) is applied on each input, and the two outputs are connected to a receiver of a device under test (DuT) by cables. The outputs may also be connected to antenna elements in the case of a radiated test. Amplifiers may be used between the channel emulator output and the transmit antennas if an increase in the available signal level is desired. The matrix H represents a MIMO channel with two or more inputs and two or more outputs.

The sub-paths may exhibit a polarization angle (between Vertical and Horizontal) based on the polarization of the transmitting antenna response combined with the characteristics of the channel. The polarized signal is observed at the virtual receive antenna to produce an output signal.

In a conducted use case, where each channel emulator output is delivered to a device port via a cable and then treated and processed by the device separately per port, the signal sub-paths do not interact prior to the receiver. In the case of using the outputs of a channel emulator to produce a transmitted signal for an over-the-air test, a unique situation occurs.

Figure 4:
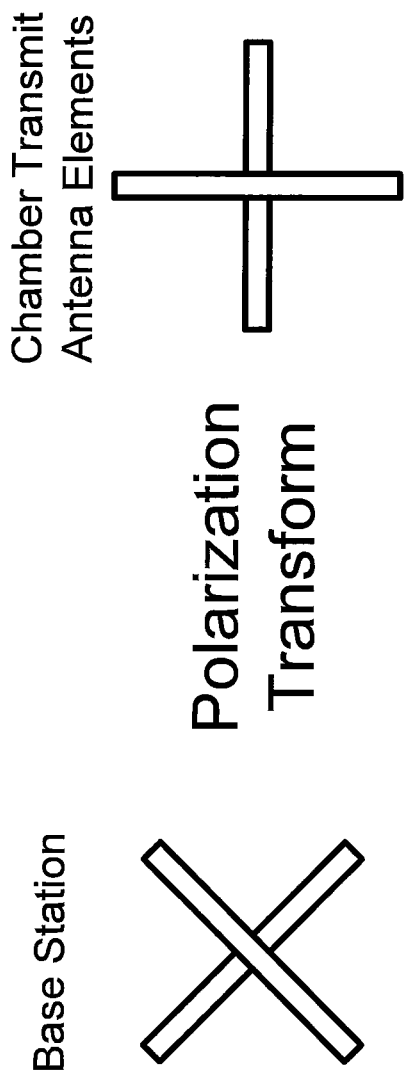
FIG. 4 represents the case where the output of the channel emulator is driving two separate antennas to form a dual polarized radiated signal.

FIG. 4 represents the case where the output of the channel emulator is driving two separate antennas to form a dual polarized radiated signal, typically used in an anechoic chamber to enable an over-the-air test of a mobile device, e.g. a cell phone. The transmitted signal can be modeled in the channel emulator with various attributes, such as a polarization, element separation, gain pattern, tilt angle, branch imbalance, XPR (Cross-Polarization Ratio), or other characteristic. The transmitted signal observed at the center of the chamber test volume includes the combination of the two or more output signals that are driving the chamber transmit antenna elements. It is desirable to orient the chamber transmit antenna elements in the "+" configuration so that the outputs of the channel emulator can drive the vertical and horizontal elements in order to transmit dual polarized signals. With this configuration the dual polarized signals align with how measurements are typically conducted and with antenna measurements, which are specified in terms of vertical and horizontal orientations. For each planewave, various polarization effects can be produced such as linear, circular, elliptical or random polarization, depending on the gain and phase differences between the transmitted signals on each +antenna pair. The correlation between the signals observed on V (Vertical) & H (Horizontal) chamber transmit antenna elements may be different depending on the type of signal that is transmitted, e.g. line-of-sight (LOS) or non-line-of-sight signals (NLOS), and for the NLOS case a zero correlation is desired because this is typically observed in measured signals from field testing.

The correlation in the emulated channel is a function of the sub-path angles of arrival (AoA) and antenna characteristics of the model used for the virtual antennas. In the standardized polarized model (i.e. the equation for H) each sub-path is more than a single planewave, because a cross-polarized scattering term is included, which is a function of the modeled phases specified. Note these phases are specified to be random and uniformly distributed over $0-2\pi$. For the uncorrelated fading case, the power transmitted from the +chamber transmit antenna elements is the sum of the vertical power and the horizontal power that is radiated, diminished by the path loss. Each sub-path, which is observed by the two virtual antennas in the model and arrive at the channel emulator outputs driving the +chamber transmit antenna elements are coherent in the standard model, i.e. at the same carrier and Doppler frequency, so their relative amplitude and phase will produce a composite radiated planewave having the composite behavior. Thus the correlation of the summation across sub-paths (that results in fading) must be zero so that the expected uncorrelated fading occurs between signals. The power delivered to the test volume, which is the region that a device will be placed in an anechoic chamber, is the power transmitted by the chamber antenna transmit elements diminished by the propagation path loss.

It is important to determine the power delivered to the device-under-test (DuT) because the performance of the device is measured at a specific range of power levels, i.e., data throughput is measured at a range of power levels and plotted as throughput curves. Alternatively a noise may be transmitted along with the signal to set a specific signal to noise ratio at the DuT (Device under Test) to produce throughput curves.

A problem occurs with this model when the DuT is a realistic antenna pattern that has a vertical and horizontal response. A complex gain Etheta corresponds to the vertically polarized complex response and another complex gain Ephi corresponds to the horizontally polarized complex response. Consider the case where the uncorrelated fading waveforms on the V & H chamber transmit antenna elements are transmitted over the air to the DuT antennas, which have a complex response in Etheta and Ephi. In this scenario, it would typically be assumed that the uncorrelated fading would still represent the sum of the powers on the V and H chamber transmit antenna elements diminished by the path loss to the device, however a further constraint is observed only in the radiated case. In the conducted case, the two output signals, i.e. the V & H signals, are received separately on each device port and treated separately so there is no combination of the two signals. In the radiated case, the V & H signals will be observed by the Etheta and Ephi of each antenna, and the signal received by the DuT will be the sum of the signals on each antenna. Since the standard channel model typically used in the industry utilizes individual sub-paths that are evaluated at each virtual antenna before being radiated on each chamber transmit antenna element, there is a common Doppler observed on each pair of sub-paths sent to the V & H chamber transmit antenna elements. That is, for a sub-path #i, there is a common Doppler at each output. When the DuT receives the V signal, the complex gain Etheta observes this signal. When it receives the H signal, the complex gain Ephi observes this signal. Each of these complex gains, such that the signals on Ephi and Etheta are combined for each antenna at the antenna terminals. Since there is a common Doppler on each V & H sub-path, each pair is coherent, i.e. at the same frequency. This is desired in the channel model because each sub-path is considered to be a planewave at a particular polarization angle. The decomposition of this angle produces coherent signals on the V & H chamber transmit antenna elements. Since the V & H components are coherent, they are combined like complex voltages at the DuT, with the magnitude being a function of the phase difference between the two components. Thus each sub-path will be observed at the DuT antenna terminals at this combined level. The standardized model (i.e. the channel model H) specifies that the cross polarization leakages $\alpha_{n,m,VH}$ and $\alpha_{n,m,HV}$, have random phases, along with the co-polarized terms $\alpha_{n,m,VV}$ and $\alpha_{n,m,HH}$. This causes the construction of the V & H signals to be a combination of co-polarized and cross-polarized terms with a random phase. When these combine at the DuT with the phase associated with Etheta and Ephi, the received signal level will be a function of the phases associated with the channel model, which are defined to be random.

Since the DuT antenna phase response is unknown, the way the V & H components combine will also be unknown and a function of the random selection of phases in the channel. Thus the composite fading waveform that is made up of the summation of the sub-paths will produce an unknown average power at each DuT antenna terminals. Therefore, the use of a standard model at the channel emulator to produce coherent sub-path components at each output does not allow proper control of the power levels at the DuT in a radiated dual polarized configuration. Furthermore, any change in the random phases associated with the channel definition will change the power level observed at the device because it changes the angle used in summing up the V&H polarized signals at the DuT (Device under Test) antenna. With an unknown power level, the emulated sub-path planewave no longer represent the original planewave at a certain polarization angle, which is the case when scattering components are included, i.e. the XPR (Cross-Polarization Ratio), is included in the model of the planewave as in the channel model H.

The same behavior results from any chamber transmit antenna element configuration when coherent sub-paths are observed from two different chamber antenna element locations, no matter the orientation, i.e. chamber transmit antenna elements from different transmit locations as described by FIG. 1. In this case, when a planewave is split among spatially diverse antenna elements, i.e. not co-located in a + or other configuration, this is a unique situation where the DuT observes the signals at two different AoAs (Angles of Arrival), such that the combination of the signal in Etheta and Ephi includes different complex gain values, i.e. one for each AoA. The result of the combination is that the power level is set based on the coherent addition using the complex gains, which are unknown, when the DuT antenna is unknown. Thus the original modeled planewave is now modified to an unknown power level and is not useful to measure the device performance without modification.

To remove this power sensitivity to the phase of the signals delivered to the device, the channel model is modified to utilize a unique Doppler per sub-path at each virtual antenna. This can be done by dithering the Doppler frequency, or sub-path AoA (Angle of Arrival) associated with one output with respect to the other, so that there will be slight differences in the Doppler of each sub-path. The modeled direction-of-travel could also be set uniquely for each sub-path at each output from a number of slightly different values. Dithering the Doppler frequency is the goal to make each component have a unique frequency so that the combined signal is approximately the power sum of the individual sub-path powers. If the AoAs (Angle of Arrival) are dithered instead, a similar result can be achieved because the Doppler frequency=velocity/$\lambda$*cos (AoA−DoT), where $\lambda$ is the wavelength of the carrier frequency, and DoT is the direction of travel. Thus dithering AoA can result in a similar behavior to dithering the Doppler frequency.

Dithering as used in the present application can refer to adding a random or pseudo-random variation to the original value or a set of values. Pseudo random sequences are well known in the art, and are defined by pseudo random number generators, also known as deterministic random bit generators. Other methods may include selecting a random sequence from a random number generator and storing it for later use. Simple methods to adjust the original values by a small delta may also be used, such as adding a small percentage to the original, e.g. offsetting the values by fixed percentage to achieve a difference. The added offsets may have a specific range of values, such as defined by a distribution. Often a Gaussian distribution can be used to emulate an additive white Gaussian noise (AWGN) model, thus the added offsets could be specified having such a distribution. Other distributions, including a uniform distribution, can provide practical methods to apply the Dithering. It is possible to specify many alternative schemes to produce a Dithering function. It is understood that these examples are intended in an illustrative sense rather than in a limiting sense.

In reference to FIG. 2, the dithering can be done to the signals, such that h11 & h12 are transmitted from the V chamber transmit antenna element and the Doppler on h21

& h22 are transmitted from the H chamber transmit antenna element. In reference to FIG. 4, independent chamber transmit antenna elements transmits V and H signals within an over-the-air test to a device under test (DuT) at mobile station having an arbitrary antenna pattern with a complex V & H response. Inputs 1 & 2 in FIG. 2 can be viewed as referring to the X antennas in FIG. 4, or another model desired for the base station. These other models may include spatially separated Vertical elements, spatially separated Horizontal elements, or spatially separated slanted elements. Outputs 1 & 2 in FIG. 2 can be viewed as referring to the V & H antennas in FIG. 4, that is, the +antennas representing the V & H chamber transmit antenna elements.

To dither the Doppler shift on one of the radiating polarizations with respect to the other means to dither the sub-path signals at Output 1 with respect to Output 2 (FIG. 2) such that signal sub-path components on sub-paths h11 and h12 are offset in frequency, or vice versa such that signal sub-path components on sub-paths h21 and h22 are offset in frequency. In other words, after dithering, h11 & h12 will have a first set of Dopplers for each sub-path and h21 & h22 will have a second set of Dopplers for each sub-path. Output 1 and Output 2 in FIG. 2 feed the +chamber transmit antenna elements in the example of FIG. 4. Input 1 and Input 2 can be viewed as inputs and Output 1 and Output 2 can be viewed as outputs of a MIMO radio channel. Additional inputs and outputs may be used. The outputs feed the +chamber transmit antenna elements as shown in FIG. 4, and the +chamber transmit antenna elements transmit to a device under test. Output 1 & Output 2 in FIG. 2 can be viewed as "virtual" receive antennas, which are used as an intermediate output. These "virtual" antennas may be modeled using the antenna characteristics of the corresponding V & H chamber transmit antenna elements (FIG. 4).

The dithering or modification of the geometric parameters is utilized to produce a phase rotation, due to the frequency difference, of each sub-path on each output. The phase rotation can be a sub-path rotation on V relative to each sub-path on the H chamber transmit antenna element, or a sub-path rotation on H relative to each sub-path on the V chamber transmit antenna element. Thus when the V & H sub-paths combined over an averaging interval, they will combine as the sum of the two powers. V or H sub-paths are spread out in Angle of Arrival, e.g. using the scaled sub-path angle offsets of FIG. 5, so each V or H sub-path already has a unique Doppler frequency, so it is the case of each sub-path having identical Doppler across V & H, where their phase matters. Applying the dithering on outputs having sub-paths with identical Doppler now sets them to be different, i.e., no longer coherent.

Accordingly, when combined at the DuT antenna with an unknown phase response, the sub-paths will no longer be coherent and thus they will be uncorrelated over a reasonably short time interval, depending on the amount of dithering or change in parameters, such that the average power level will now be represented by the power sum of the two sub-paths. This results in a power level received at the DuT without the phase sensitivity due to the random phases defined within the model that produces power changes. The power level of the original polarized sub-path is also more closely modeled without the error that results from the decomposition and phasor addition at the DuT.

FIG. 5 is a table of 20 sub-path offset angles within a cluster, given for a one degree rms (root-mean-square) angle spread. For V & H components received at a device under test at the same AoAs, the Doppler frequency is the same for each of these V & H components as defined by the standardized model. Thus the V & H components time-evolve at the same exact rate, i.e. they accumulate phase at the same rate. When two sinusoids have a unique amplitude and phase, but with the same frequency, they combined vectorally to a new amplitude and a new phase, but at this same frequency. The dithering is done to only one polarization, so the other remains unchanged. Alternatively, both polarizations can be dithered to result in slightly different Doppler frequencies on each sub-path component. So when the frequencies are slightly different after dithering, the combination of the V&H components is now a power combination, because adding sinusoids at different frequencies results in a time average value that is the sum of the powers of each component.

The 20 sinusoids defined in the table in FIG. 5 represent an azimuth angle of arrival of 20 planewaves also known as 20 sub-paths, i.e. the 20 sinusoids that make up a path with a given path angle spread. These 20 angles are specified in standards and were originally based on a quantizing of the power angle distribution of a Laplacian probability density that defines a spatial cluster. When multiple transmit locations are used in a chamber to form a spatial cluster, then multiple sets of 20 sub-path angles are used together in producing a quantized set of powers and angles to approximate the standardized Laplacian. The 20 values in the table have an angle spread sigma that is normalized to 1 degree. To get any other value of angle spread, the table can be multiplied by the desired angle spread value in degrees to obtain the new angles. Although 20 sub-paths are chosen to represent each path in the model, a different number of sub-paths could be used if desired.

Figure 6:
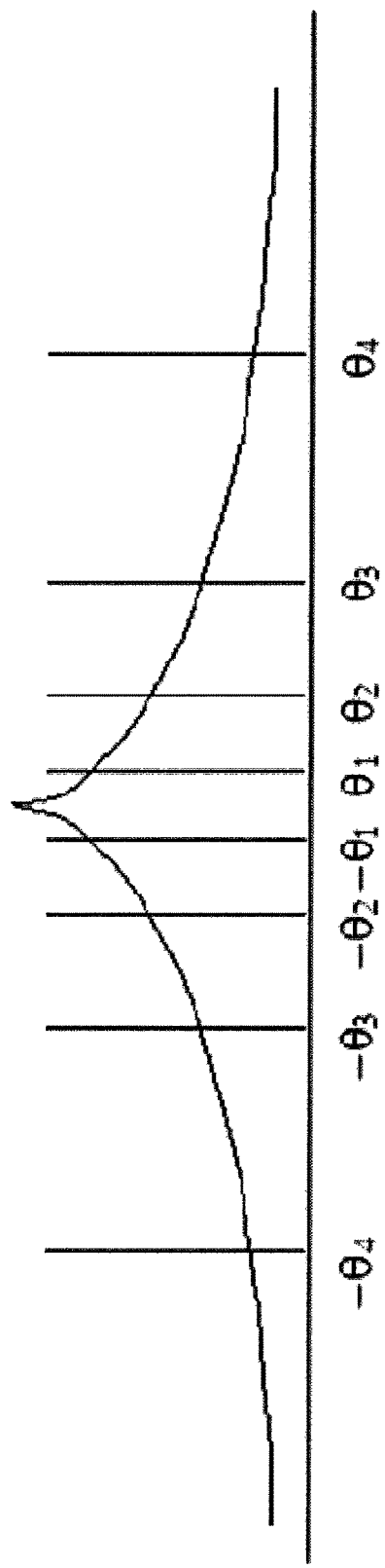
FIG. 6 illustrates a Laplacian function representing a power azimuth spectrum for an even number of sub-paths of equal power.

FIG. 6 illustrates a Laplacian function representing a power azimuth spectrum for an even number of sub-paths of equal power, such as for 20 sub-paths as shown in the table in FIG. 5. The straight lines at the discrete angles represent equal power sinusoids, each having ½0th the power in the path that they emulate. The Laplacian function is often used to represent the power angle spectrum of a single received spatial cluster, which is part of a multipath radio frequency signal.

Figure 7A:
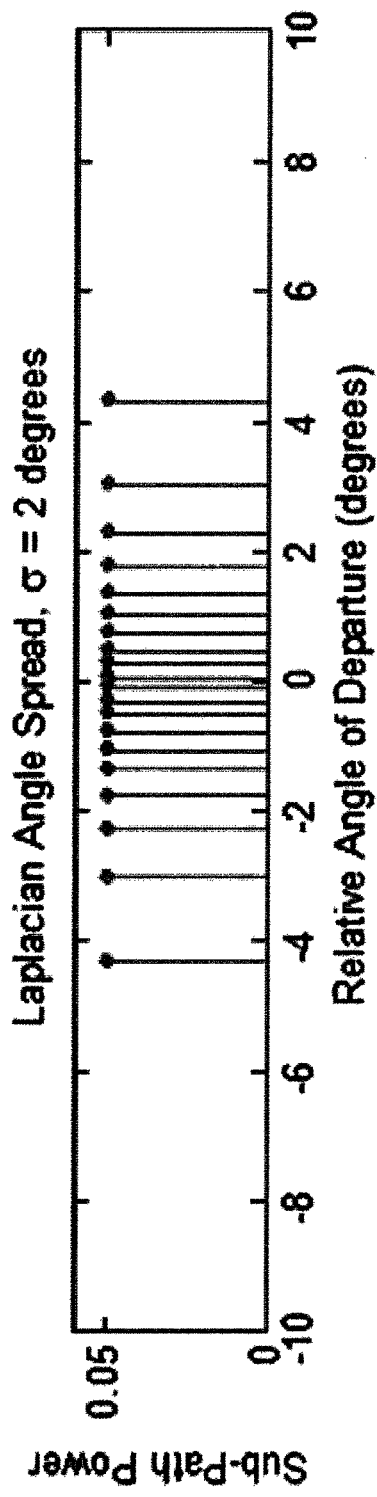
FIG. 7A illustrates a set of 20 sinusoids that has been scaled to result in an angle spread of 2 degrees.

FIG. 7A illustrates a set of 20 sinusoids that has been scaled to result in an angle spread of 2 degrees, typical of a value used at the base station to represent a spatial signal. The angle spread is a power weighted "sigma" of a set of relative angles of departure at the base station, and the result of that is less than the set of relative angles of departure.

Figure 7B:
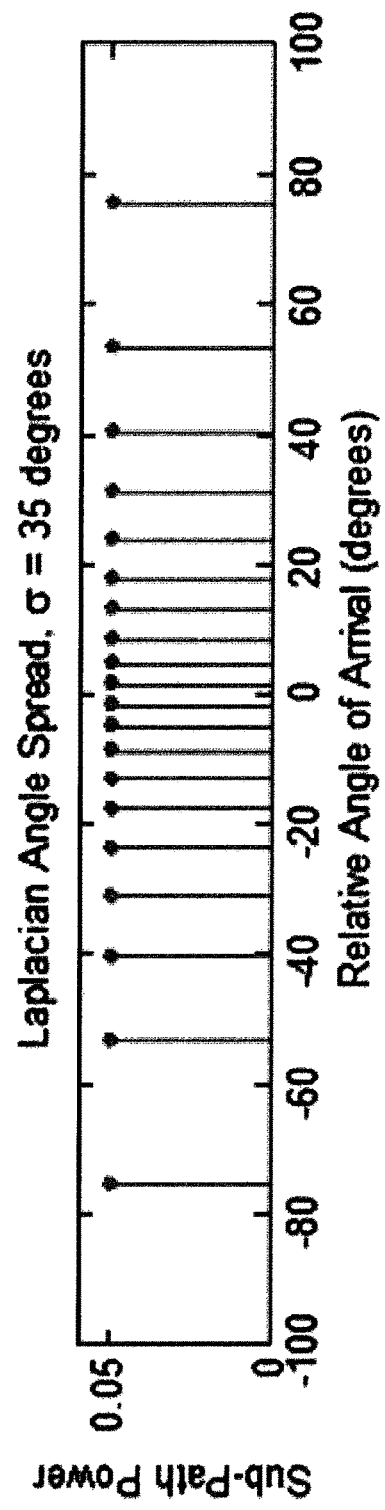
FIG. 7B illustrates a set of 20 sinusoids that has been scaled to result in an angle spread of 35 degrees.

FIG. 7B illustrates a set of 20 sinusoids that has been scaled to result in an angle spread of 35 degrees, typical of a value used at the mobile station to represent a spatial signal. The angle spread is a power weighted "sigma" of a set of relative angles of arrival at the mobile station, and the result of that is less than the set of relative angles of arrival.

Figure 8:
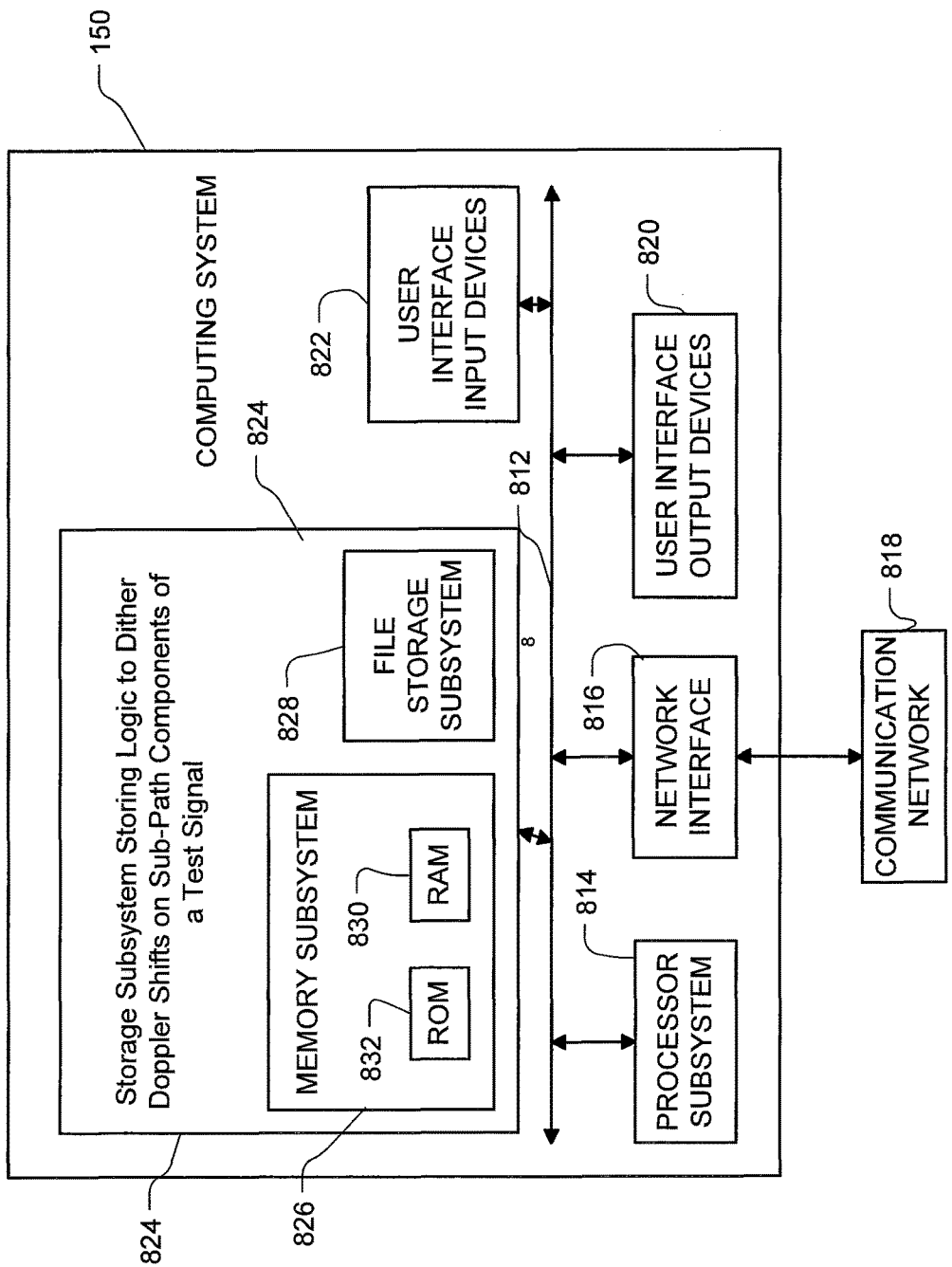
FIG. 8 is a simplified block diagram of an embodiment of the computing system in FIG. 1.

FIG. 8 is a simplified block diagram of an embodiment of the computing system 150 of the system 100 in FIG. 1. The arrangement of the transmit antennas TX and the characteristics of transmit signals $S_i$ provided by the transmit antennas TX to a device-under-test (DuT) as illustrated in FIG. 1 can be implemented by a computer program stored in memory, or in other memory that can be distributed separately from the computing system as an article of manufacture. In the illustrated example in FIG. 8 these instructions are stored in storage subsystem 824 within the computing system 150.

Computing system 150 typically includes a processor subsystem 814 which communicates with a number of peripheral devices via bus subsystem 812. Processor subsystem 814 may contain one or a number of processors. The peripheral devices may include a storage subsystem 824, comprising a memory subsystem 826 and a file storage subsystem 828, user interface input devices 822, user interface output devices 820, and a network interface subsystem 816. The input and output devices allow user interaction with computing system 150. Network interface subsystem 816 provides an interface to outside networks, including an interface to communication network 818, and is coupled via communication network 818 to corresponding interface devices in other computing systems. Communication network 818 may comprise many interconnected computing systems and communication links. These communication links may be wireline links, optical links, wireless links, or any other mechanisms for communication of information. While in one embodiment, communication network 818 is the Internet, in other embodiments, communication network 818 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells on a single integrated circuit chip with other components of the computing system.

User interface input devices 822 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computing system 150 or onto computer network 818.

User interface output devices 820 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide for non-visual display such as via audio output devices. In general, use of the term "output device" is intended to include all possible types of devices and ways to output information from computing system 150 to the user or to another machine or computing system.

Storage subsystem 824 stores the basic programming and data constructs that provide the functionality of certain embodiments of the present invention. For example, the various modules implementing the functionality of certain embodiments of the invention may be stored in storage subsystem 824. These software modules are generally executed by processor subsystem 814.

Memory subsystem 826 typically includes a number of memories including a main random access memory (RAM) 830 for storage and instructions and data during program execution and a read only memory (ROM) 832 in which fixed instructions are stored. File storage subsystem 828 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystems 828. The host memory 826 contains, among other things, computer instructions such as program code which, when executed by the processor subsystem 814, cause the computing system to operate or perform functions as described herein. As used herein, processes and software that are said to run in or on "the host" or "the computer", execute on the processor subsystem 814 in response to computer instructions and data in the host memory subsystem 826 including any other local or remote storage for such instructions and data.

Bus subsystem 812 provides a mechanism for letting the various components and subsystems of computing system 150 communicate with each other as intended. Although bus subsystem 812 is shown schematically as a single bus, alternative embodiments of the bus subsystem may use multiple busses.

Computing system 150 itself can be of varying types including a personal computer, a portable computer, a workstation, a computer terminal, a network computer, a television, a mainframe, or any other data processing system or user device. Due to the ever changing nature of computers and networks, the description of computing system 150 depicted in FIG. 8 is intended only as a specific example for purposes of illustrating the embodiments of the present invention. Many other configurations of computing system 150 are possible having more or less components than the computing system depicted in FIG. 8.

Aspects of the present technology may be practiced as a method or device adapted to practice the method. The technology may be an article of manufacture such as a media impressed with logic to carry out the steps of the method when executed by a computer.

As described herein, the complex gains described by the standardized dual polarized channel model H has common Doppler on each sub-path, but random phase. When performing a radiated test, signals are transmitted in accordance with a specific channel model having polarized scattering that represents signals coupled from V to H and H to V by transmitting the signals using multiple dual polarized V & H chamber antenna transmit elements, and receiving at one or more device antennas by their complex gains Etheta and Ephi. This results in a combined signal with a final phase difference, which sets the power. This results in a power that is sensitive to phase of the composite signal, which is undesirable since the composite signal is a function of the random starting values of the model, and the XPR (Cross Polarization Ratio) coupling which represents scattering for the channel. The phase difference that is present in the complex gains Etheta and Ephi is part of the device being measured. The sensitivity of the resulting power to the phase between V & H components means that the antenna will perform differently as the phase angle is changed, which implies multiple phases need to be tested.

The present technology dithers the Doppler frequency on one of the radiating polarizations with respect to the other, to remove the coherent phasing that produces the power sensitivity. This results in an averaging of the antenna performance, which is a more desirable measurement, and is not phase sensitive.

While examples and implementations of the technology disclosed are detailed above, it is understood that these examples are intended in an illustrative rather than in a limiting sense. Computer-assisted processing is implicated in the described implementations. Accordingly, the technology disclosed may be embodied in methods for line speed sequence number checking of frames, systems including logic and resources to perform line speed sequence number checking of frames, systems that take advantage of computer-assisted line speed sequence number checking of frames, media impressed with logic to perform line speed sequence number checking of frames, data streams impressed with logic to perform line speed sequence number checking of frames, or computer-accessible services that carry out computer-assisted line speed sequence number checking of frames. It is contemplated that modifications and combinations will readily occur to those skilled in the art, which modifications and combinations will be within the spirit of the invention and the scope of the following claims.

The invention claimed is:

1. A method of generating and transmitting a test signal for an over-the-air test of a device-under-test that is in simulated motion, comprising:

dithering Doppler shifts of a carrier frequency of the test signal on one or more sub-path components of the test signal to produce slightly different Doppler shifted frequencies per sub-path component, wherein the sub-path components are at a first polarization orientation and a second polarization orientation, wherein different Doppler shifted frequencies, respectively, are radiated from two respective elements in a dual polarized antenna.

2. The method of claim 1, wherein the dithering Doppler shifts includes dithering a first sub-path component in the sub-path components at the first polarization orientation while keeping the first sub-path component in the sub-path components at the second polarization orientation at a first Doppler shift of the carrier frequency of the test signal.

3. The method of claim 2, wherein the first Doppler shift of the carrier frequency of the test signal is an undithered Doppler shift of the carrier frequency of the test signal.

4. The method of claim 1, wherein the dithering Doppler shifts includes keeping a first sub-path component in the sub-path components at the first polarization orientation at a second Doppler shift of the carrier frequency of the test signal while dithering the first sub-path component in the sub-path components at the second polarization orientation.

5. The method of claim 4, wherein the second Doppler shift of the carrier frequency of the test signal is an undithered Doppler shift of the carrier frequency of the test signal.

6. The method of claim 1, wherein the dithering Doppler shifts includes dithering a first sub-path component in the sub-path components at the first polarization orientation and dithering a second sub-path component in the sub-path components at the second polarization orientation.

7. The method of claim 1, wherein the first polarization orientation is horizontal and the second polarization orientation is vertical.

8. The method of claim 1, wherein the dithering Doppler shifts corresponds to varying angles of arrival of the sub-path components of the test signal relative to the simulated motion of the device-under-test.

9. The method of claim 1, wherein the dithering Doppler shifts corresponds to varying one or more directions of travel with respect to specific sub-paths by the device-under-test in simulated motion relative to the test signal.

10. The method of claim 1, wherein the dithering Doppler shifts corresponds to varying one or more velocities of the device-under-test in simulated motion relative to each sub-path of the test signal.

11. A system for generating and transmitting a test signal for an over-the-air test of a device-under-test that is in simulated motion, comprising:

a pair of elements in a dual polarized transmit antenna for transmitting sub-path components of the test signal, wherein the pair of elements in a dual polarized transmit antenna includes a first element arranged to transmit a first polarization orientation, and a second element arranged to transmit a second polarization orientation different from the first polarization orientation;

a channel emulator generating the sub-path components of the test signal; and a controller coupled to the channel emulator, including logic to dither Doppler shifts of a carrier frequency on one or more of the sub-path components of the test signal to produce slightly different Doppler shifted frequencies per sub-path component, wherein the sub-path components are at the first polarization orientation and the second polarization orientation, wherein different Doppler shifted frequencies, respectively, are radiated from two respective elements in a dual polarized antenna.

12. The system of claim 11, wherein the logic to dither Doppler shifts includes logic to dither a first sub-path component in the sub-path components at the first polarization orientation, and to keep the first sub-path component in the sub-path components at the second polarization orientation at a first Doppler shift of the carrier frequency of the test signal.

13. The system of claim 12, wherein the first Doppler shift of the carrier frequency of the test signal is an undithered Doppler shift of the carrier frequency of the test signal.

14. The system of claim 11, wherein the logic to dither Doppler shifts includes logic to keep a first sub-path component in the sub-path components at the first polarization orientation at a second Doppler shift of the carrier frequency of the test signal, and to dither the first sub-path component in the sub-path components at the second polarization orientation.

15. The system of claim 14, wherein the second Doppler shift of the carrier frequency of the test signal is an undithered Doppler shift of the carrier frequency of the test signal.

16. The system of claim 11, wherein the logic to dither Doppler shifts includes logic to dither a first sub-path component in the sub-path components at the first polarization orientation, and to dither a second sub-path component in the sub-path components at the second polarization orientation.

17. The system of claim 11, wherein the first polarization orientation is horizontal and the second polarization orientation is vertical.

18. The system of claim 11, wherein the logic to dither Doppler shifts includes logic to correspond to varying angles of arrival of the sub-path components of the test signal relative to the simulated motion of the device-under-test.

19. The system of claim 11, wherein the logic to dither Doppler shifts includes logic to correspond to varying one or more directions of travel with respect to specific sub-paths by the device-under-test in simulated motion relative to the test signal.

20. The system of claim 11, wherein the logic to dither Doppler shifts includes logic to correspond to varying one or more velocities of the device-under-test in simulated motion relative to each sub-path of the test signal.

* * * * *